ELAPSED TIME RECORDING DEVICE AND METHOD

Filed May 31, 1966 5 Sheets-Sheet 1

INVENTORS
HAROLD GAMBURD,
JAMES E. WALKER
BY
MAHONEY & HORNBAKER
ATTORNEYS

ELAPSED TIME RECORDING DEVICE AND METHOD

Filed May 31, 1966 5 Sheets-Sheet 2

INVENTORS
HAROLD GAMBURD,
JAMES E. WALKER
BY
MAHONEY & HORNBAKER
ATTORNEYS

ELAPSED TIME RECORDING DEVICE AND METHOD

INVENTORS
HAROLD GAMBURD,
JAMES E. WALKER
BY
MAHONEY & HORNBAKER
ATTORNEYS

June 25, 1968 H. GAMBURD ET AL 3,390,395

ELAPSED TIME RECORDING DEVICE AND METHOD

Filed May 31, 1966 5 Sheets-Sheet 4

INVENTORS
HAROLD GAMBURD,
JAMES E. WALKER
BY
MAHONEY & HORNBAKER
ATTORNEYS

INVENTORS
HAROLD GAMBURD,
JAMES E. WALKER
BY
MAHONEY & HORNBAKER
ATTORNEYS

United States Patent Office 3,390,395
Patented June 25, 1968

3,390,395

ELAPSED TIME RECORDING DEVICE AND METHOD

Harold Gamburd, Los Angeles, and James E. Walker, El Segundo, Calif., assignors to Commac, Inc., El Segundo, Calif., a corporation of California Filed May 31, 1966, Ser. No. 553,895
21 Claims. (Cl. 346—1)

ABSTRACT OF THE DISCLOSURE

A sheet-like record member has a column of consecutive time interval numbers starting with zero and a column of expense charge numbers each relating to an aligned time interval member reflecting an accumulated charge at a preplanned rate for that particular time interval plus the entire of the next consecutive time interval. The record member is inserted into the device which, upon actuation, automatically feeds it to a starting position visually indicating the zero time interval number and associated expense charge number. Upon initiation of a time period, preferably the start of a phone call, the device intermittently feeds the record member for visually indicating the appropriate total accumulated time intervals expired and the total charge for said total time intervals plus the entire of the one being invaded, the final totals being permanently indicated on the record member at the phone call termination.

This invention relates to a method of recording elapsed time and a device for carrying out said method. More particularly, this invention relates to an elapsed time recording device and method for constantly indicating the total accumulated equal time intervals expired during an indeterminate time period, such as during a telephone call. Even more specifically, this invention relates to an elapsed time recording device and method for constantly indicating the total number of expired time intervals of an indeterminate time period during the invasion of the next time interval directly following the expired time intervals, and may also include the constant indication of an accumulated expense charge directly relating to the number of complete time intervals expired and the next time interval being invaded, such as the total complete minutes expired during a telephone call and the total expense charge for said expired minutes and the next minute presently being used. Also, the device and method may include the final permanent indication of the total complete time intervals in the time period, as well as the total expense charge for these complete time intervals, and the next time interval being invaded at the termination of said time period.

Many prior forms of elapsed time recording devices have been provided, most of which have been extremely complicated and expensive. For instance, in one prior form the time and expense charge are recorded and maintained related in a complex electronic circuit and ultimately translated into printing means for final recordation at the termination of a time period. Other prior forms have made use of timing means in conjunction with related and preset mechanical counters so that the final time and expense charge may be directly visually indicated at the expiration of the time period.

In both of these prior forms it is obviously necessary to preset the time charge recording device so as to be properly related to the timing device in order that an expense charge rate may be translated into time intervals of the time period. Furthermore, this problem becomes even more complex in timing a time period in which certain of the initial time intervals of the time period are charged at one expense rate and the remaining time intervals of said time period are charged at another expense rate, for instance, the expense charges for a telephone call are based on a flat rate for the first three minutes of said telephone call and regardless of what portion of these three minutes are used, whereas each additional minute over the first three minutes may be charged at an equal one minute increment or by some other relationship. Obviously, to adapt these prior constructions for use in indicating the time and charges for a telephone call requires even more complex circuitry in order to relate the first three minutes of the call to the flat base rate and the remaining minutes of the call to the equal overtime charge for each of said additional minutes.

It is, therefore, an object of our invention to provide an elapsed time recording device and method wherein there is no requirement of mechanically or electronically presetting a predetermined relationship between time and expense charge. With the present invention, this relationship between the expired time and the time interval rate is initially determined for a large number of time interval and expense charge rate relationships, and a series of sheet-like record members are initially formed with various groups of these record members having different sequential time interval and expense rate relationships formed thereon. The elapsed time recording device is constructed for indicating on a given record member the particular time interval and related expense charge applicable to that time interval in the time periods so that it is merely necessary to choose a record member at the beginning of the time period having the proper time interval and expense charge relationship formed thereon and the recording device may operate in the identical manner regardless of which record member is chosen and used.

It is a further object of our invention to provide an elapsed time recording device and method of the foregoing type in which the final total complete time intervals used in a given time period and the total accumulated rate for these time intervals and the last time interval invaded are permanently recorded on the record member so that a permanent record is provided. This is accomplished by forming the recording device with means thereon actionable automatically at the termination of a time period for permanently marking the record member being used with the device adjacent the last time interval and expense charge indicated at the time of said time period termination. The particular record member may then be removed from the recording device and preserved as a permanent record.

It is still a further object of our invention to provide an elapsed time recording device and method of the foregoing type which does not require complicated and expensive mechanical or electronic components required for setting up a proper relationship between time intervals and expense charges. Again, by originally providing record members with proper time interval and expense charge relationships formed thereon according to any relationship desired, it is simply a matter of choosing the proper record member for the particular situation and expense charge rate desired with the device operating in the identical manner regardless of which record member is used. In this manner, it is simple, merely by proper calulation, to provide record members with relatively complex time interval and expense charge rate structures thereon, for instance, in the case of telephone calls it is merely necessary to use the same base rate for the first three time intervals indicated and increase the expense charge by the constant overtime charge for each one minute time interval thereafter, or in whatever other manner the overtime is charged.

It is also an object of our invention to provide an elapsed time recording device and method which does not require special skills or training for the operation thereof, but rather the device may be operated and the method carried out by anyone following simple instructions. The recording device may be formed for automatically feeding a record member to a proper starting position, and once the recording device is actuated to start the indication during a time period, the indication will take place completely automatically as the time intervals expire and the accumulated total of complete time intervals expired and the expense charge for this accumulated total of time intervals with the addition of the expense charge for the time intervals at that moment being invaded are freely visible at all times during the time period. Furthermore, at the termination of the time period, the total of the completed time intervals used and the total of the expense charge applicable are permanently recorded automatically on the record member.

It is still another object of our invention to provide an elapsed time recording device and method which may be used for recording the elapsed time of telephone calls and the appropriate expense charge for a given call. In such use, the recording device is originally set up with the proper record member for the particular telephone call to be made and prior to the telephone call being placed. A switch is provided positioned so as to be closed when the telephone receiver is removed for the telephone call and opened when the telephone receiver is replaced at the termination of the call, and the device is arranged so that the time interval and expense charge recording will not commence until the switch on the telephone is closed and a start switch of the device thereafter activated, so that the recording is not begun until the call has been properly placed and actually initiated. At the termination of the call, however, which termination is accomplished by replacing the telephone receiver, the opening of the switch on the telephone automatically terminates the recording cycle and causes the permanent recording of the accumulated total complete time intervals and the total accumulated expense charge applicable for that particular telephone call and at the rate originally determined.

Other objects and advantages of the invention will be apparent from the following specification and the accompanying drawings which are for the purpose of illustration only, and in which.

Figures 1, 3, 4:
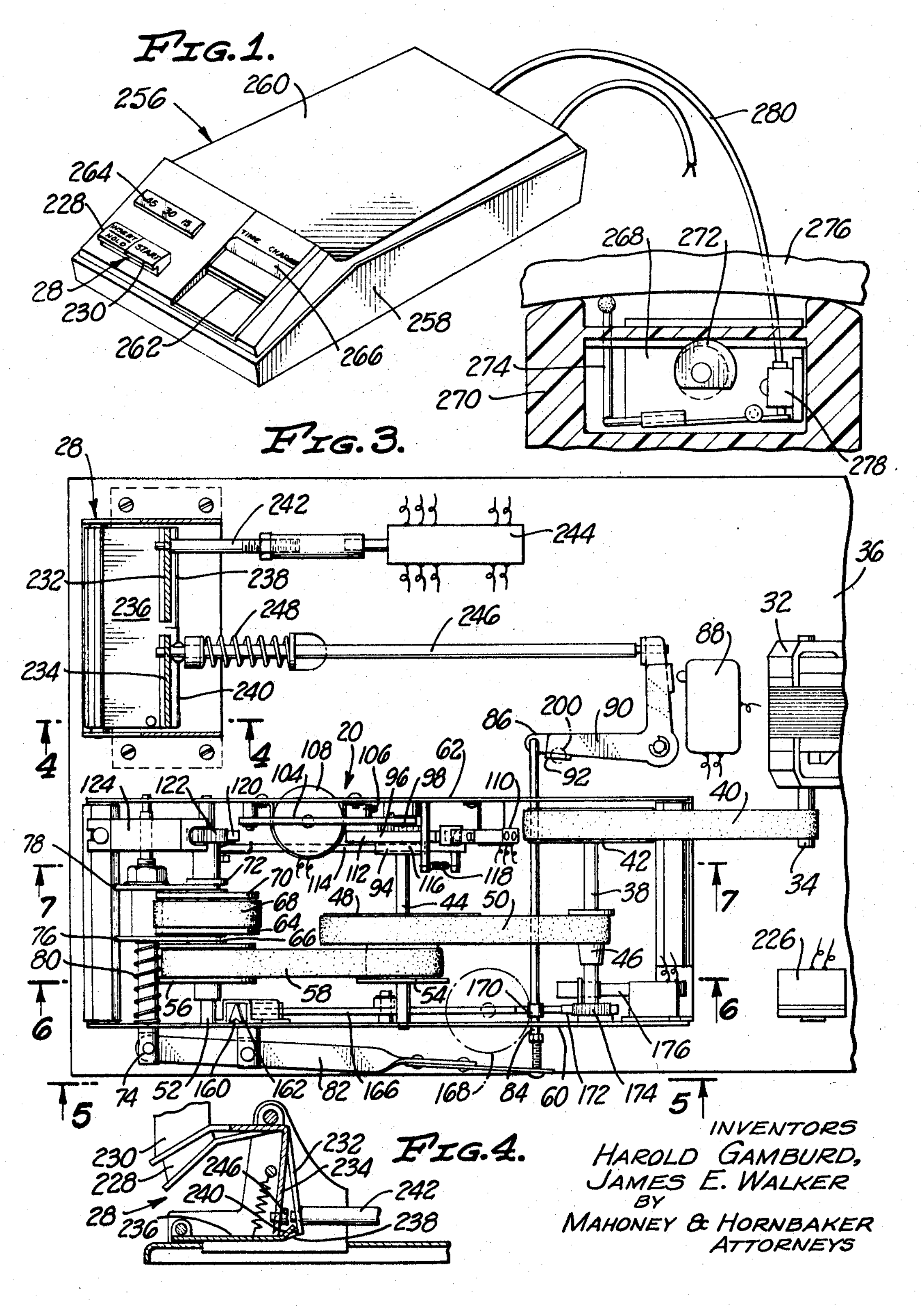
FIG. 1 is a part isometric, and a part fragmentary, enlarged, sectional view showing an ambient of the time interval recording device of the present invention with the telephone switch forming a part thereof shown enlarged and mounted on a telephone in operating position.
FIG. 3 is a fragmentary, top plan view of the left-hand portion of FIG. 2 with the case and other parts removed and parts in section to show certain of the internal components.
FIG. 4 is an enlarged, fragmentary, vertical, sectional view, part in elevation, taken along the broken line 4—4 in FIG. 3.

Referring to the drawings, an embodiment of the elapsed time recording device of the present invention is shown for progressively and finally indicating the elapsed time and expense charges of a telephone call. Although the principles of the present invention may have relatively wide application in other uses, this is one of the prime purposes to which these principles can be advantageously applied.

Figure 2:
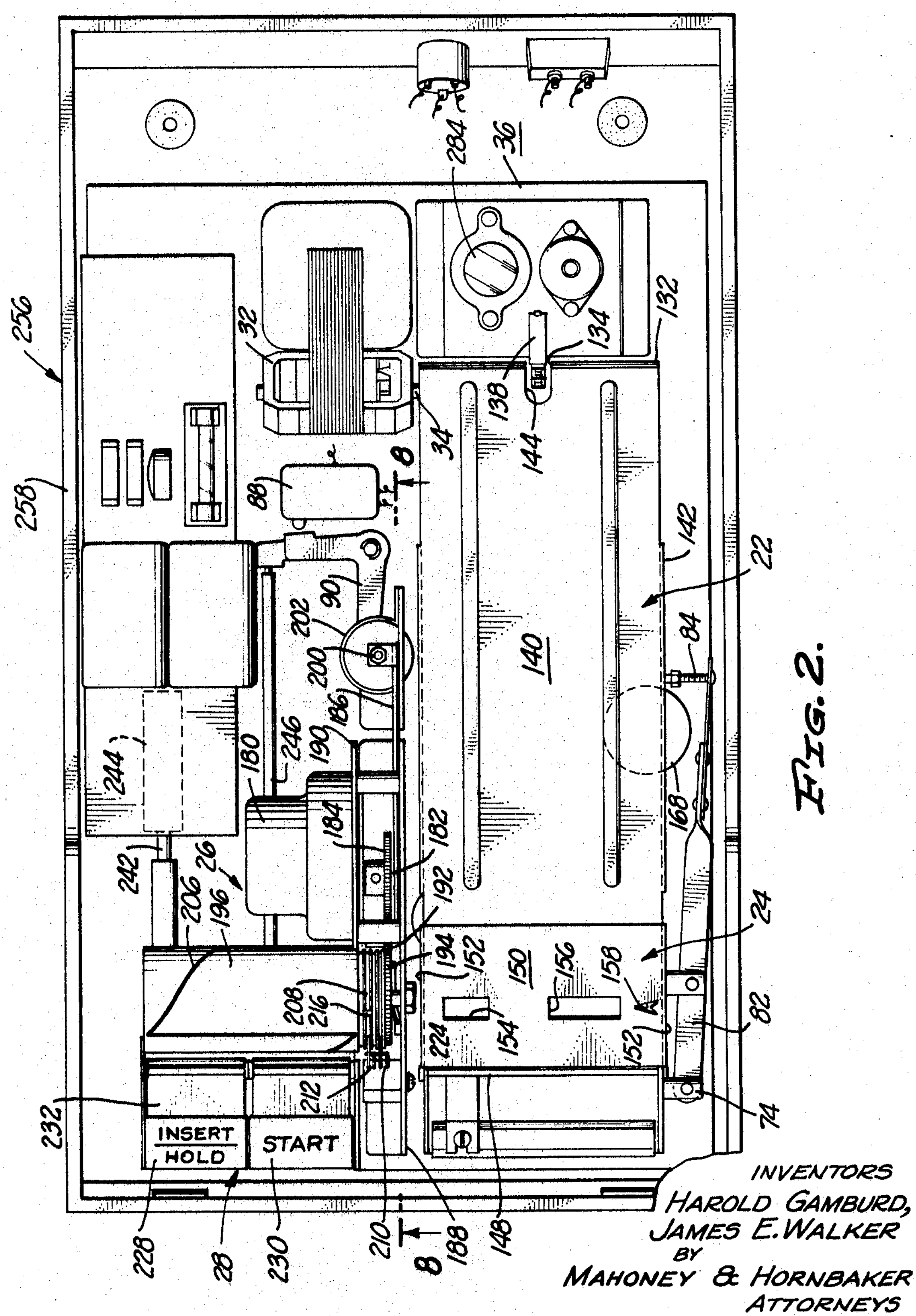
FIG. 2 is an enlarged, top plan view of the time interval recording device of FIG. 1 with the cover removed and showing the components thereof in elevation.
Figure 5:
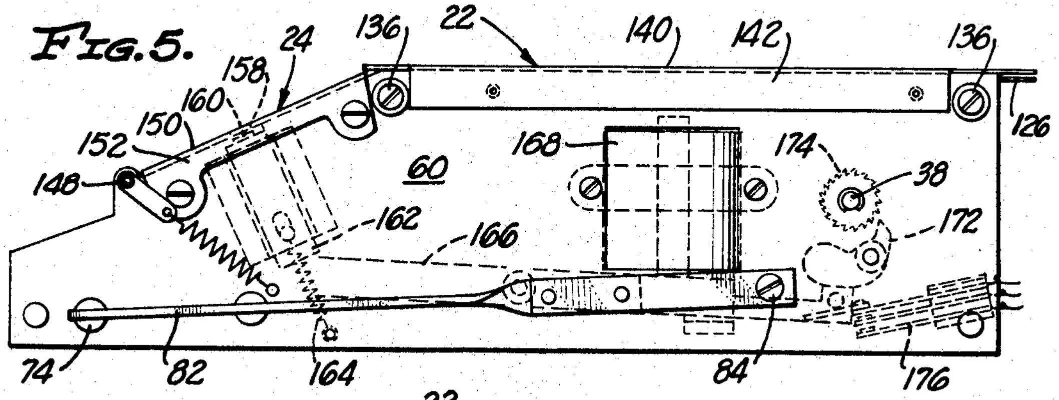
FIG. 5 is an enlarged, fragmentary, side elevation taken along the broken line 5—5 in FIG. 3, but with the removed parts replaced.
Figure 6:
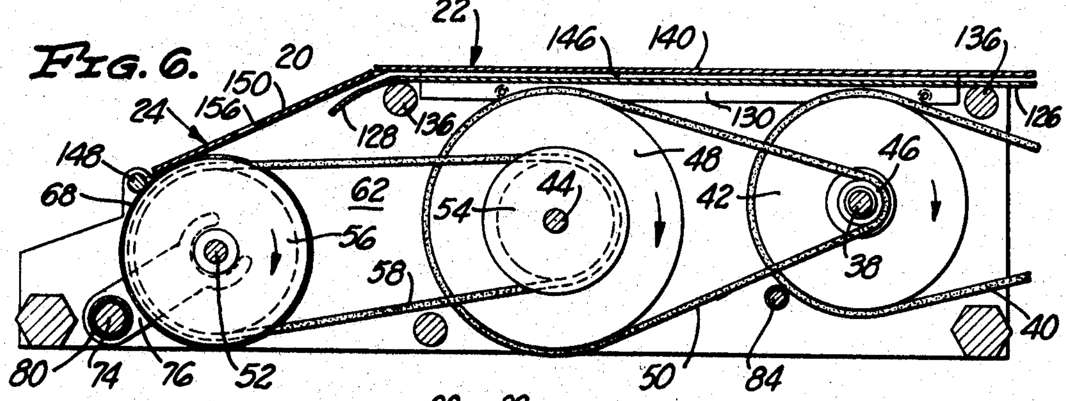
FIG. 6 is an enlarged, vertical, sectional view, part in elevation, taken along the broken line 6—6 in FIG. 3, but with the removed parts replaced.
Figure 7:
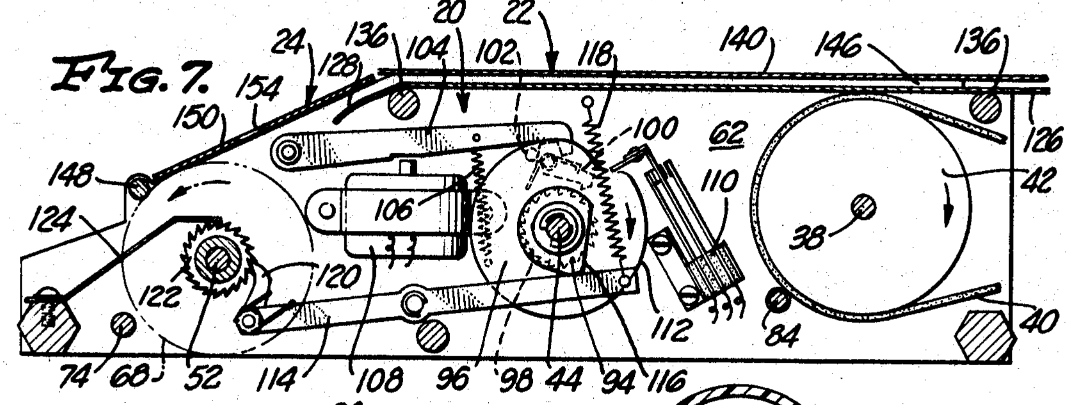
FIG. 7 is an enlarged, vertical, sectional view, part in elevation, taken along the broken line 7—7 in FIG. 3, but with the removed parts replaced.
Figure 9:
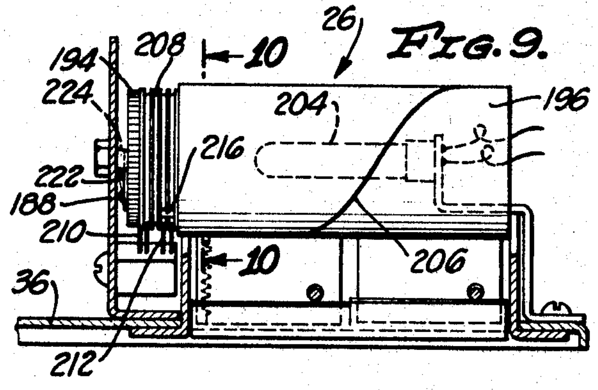
FIG. 9 is a vertical, sectional view, part in elevation, taken along the broken line 9—9 in FIG. 8.
Figure 10:
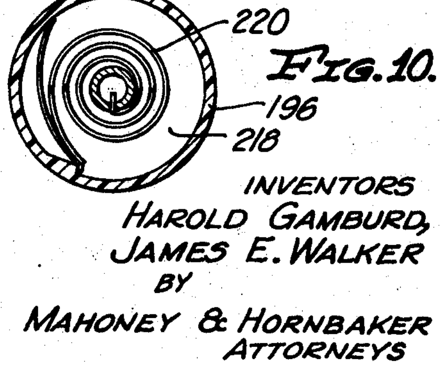
FIG. 10 is an enlarged, fragmentary, vertical sectional view, part in elevation, taken along the broken line 10—10 in FIG. 9.
Figure 8:
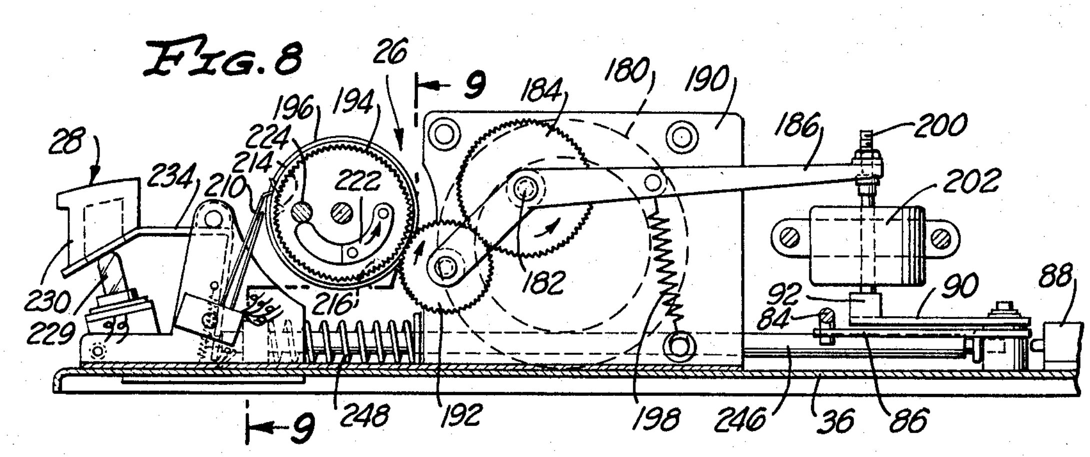
FIG. 8 is an enlarged, fragmentary, vertical, sectional view, part in elevation, taken along the broken line 8—8 of FIG. 2 and with the case removed.
Figures 12, 13:
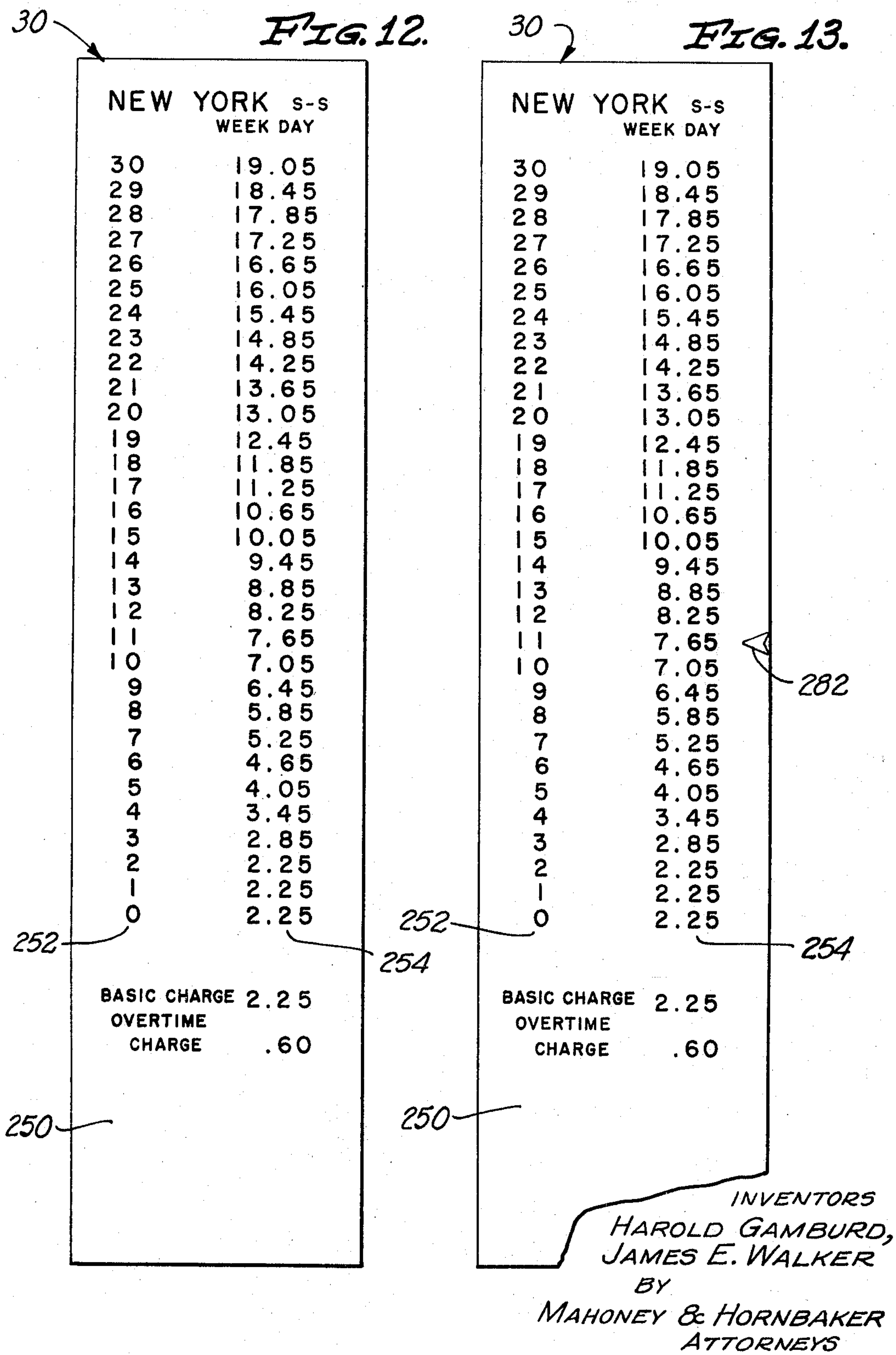
FIG. 12 is an enlarged, plan view of a typical record member or card used with the time interval recording device of FIGS. 1 through 10.
FIG. 13 is a view similar to FIG. 12 and showing the record member after the completion of a time period and with the total time intervals and expense charge permanently indicated thereon.

As shown, the major subassembly components of the elapsed time recording device include time interval measuring means, generally indicated at 20 and best seen in FIGS. 3, 6 and 7; record member positioning means, generally indicated at 22 and best seen in FIGS. 2, 5, 6 and 7; indicator means, generally indicated at 24 and best seen in FIGS. 2, 5, 6 and 7; timing means, generally indicated at 26 and best seen in FIGS. 2, 8 and 9; manual control means, generally indicated at 28 and best seen in FIGS. 2, 3, 4 and 8; and a record member, generally indicated at 30 and shown in FIGS. 12 and 13. Except as hereinafter specifically pointed out, all of the operating component subassemblies are shown in the at rest position and prior to the start of a time cycle or period. Furthermore, all of the components of the device may be formed of usual and appropriate material for performing the required function hereinafter set forth.

Referring particularly to FIGS. 3, 6 and 7, the time interval measuring means, generally indicated at 20, is powered by the synchronous speed, electric drive motor 32 having the drive shaft 34 and positioned on the chassis 36 rotating the shaft 38 through the belt 40 and pulley 42. Shaft 38 in turn rotates the shaft 44 through the pulleys 46 and 48 and the belt 50, and shaft 44 rotates the shaft 52 through the pulleys 54 and 56 and the belt 58. All of the shafts 38, 44 and 52 are rotatably mounted extending laterally between the upright side plates 60 and 62, and these plates are also secured to the chassis 36.

Axially, slidably secured on shaft 52 for rotation therewith is the clutch plate 64 having the grooved collar 66, and axially adjacent this clutch plate 64 is the friction roller 68, also mounted on the shaft 52 but rotatable relative thereto. Axially adjacent the other side of the friction roller 68 is the clutch plate 70 having the grooved collar 72 and the clutch plate and collar are freely rotatable relative to shaft 52 and axially shiftable therealong.

A clutch control rod 74 is mounted extending axially, slidably through the side plates 60 and 62 spaced forwardly and below the shaft 52 with this control rod having the clutch control arms 76 and 78 secured thereto and extending axially, outwardly spaced along the clutch plates 64 and 70. The clutch control arms 76 and 78 are formed forked at the ends thereof and are received in the clutch plate collars 66 and 72 with these clutch plate collars being rotatable relative to the clutch control arms, but the clutch control arms being engaged therewith and capable of axially shifting the clutch plates 64 and 70, as best seen in FIGS. 3 and 6. Thus, when the clutch control rod 74 is axially shifted toward the side plate 62, clutch plate 64 will be shifted into axial abutment and driving the friction roller 68 while clutch plate 70 will be shifted axially away from this friction roller, and the opposite shifting of the clutch control rod will engage the clutch plate 70 with the friction roller and move the clutch plate 64 away.

Clutch control rod 74 is resiliently urged toward the side plate 62 by the spring 80 and outward of the side plate 60 is pivotally engaged with a clutch actuating arm 82 extending along the outer side of the side plate 60. Clutch actuating arm 82 is pivoted intermediate the length thereof on the side plate 60 and at the rearward end is adjustably secured to an axially movable clutch actuating rod 84. Rod 84 is in turn axially, slidably received through the side plates 60 and 62, and projects outwardly of the side plate 62 for pivotal connection to one end of a generally L-shaped bell-crank arm 86. Bell crank arm 86 is pivoted on the chassis 36 adjacent the side plate 62 and is formed, as one of its functions, to engage the control switch 88.

A blocking arm 90 having the upstanding flange 92 is mounted overlying the bell-crank arm 86 and pivotally movable exactly with this bell-crank arm. The purpose of this blocking arm and its associated flange is for certain cooperation with a portion of the timing means 26, all of which will hereinafter be described. Also, the end of the bell-crank arm 86 adjacent the control switch 88 is secured to a portion of the manual control means 28 for a particular co-action therebetween, again to be hereinafter more fully explained.

Referring particularly to FIGS. 3 and 7, the shaft actuating cam 94 and switch control cam 96 are secured together for unitary motion and are rotatably mounted over the shaft 44 inward of the side plate 62 so that the shaft is normally freely rotatable relative to these cams. A toothed cam driving wheel 98 is secured to shaft 44 between the switch control cam 96 and the side plate 62 so that this cam driving wheel 98 directly, radially aligns with a pivoted engagement pawl 100, pivoted on the switch control cam 96 and spring urged toward engagement with the cam driving wheel 98. Engagement pawl 100 is normally retained pivoted out of engagement with the cam driving wheel 98 and against the pin 102 by the pawl engagement arm 104, which pawl engagement arm is pivoted to the side plate 62, spring urged downwardly to engage the pawl 100 by the spring 106, and is urged upwardly at selected periods for disengagement from the pawl 100 by the electric solenoid 108.

A two-way switch 110, for a purpose to be later discussed, is positioned on the side plate 62 slidably engaged with the cam surface 112 on the switch control cam 96, and a shaft actuating arm 114 pivoted on the side plate 62 is positioned slidably engaged against the cam surface 116 on the shaft actuating cam 94, this latter actuating arm being spring urged upwardly to maintain the slidable engagement with the cam surface 116 by a spring 118. Shaft actuating arm 114 is pivoted on the side plate 62 forwardly of the shaft actuating cam 94 and at the forward end of this actuating arm is mounted the pivotal, spring urged, shaft actuating pawl 120 engaged with the actuating wheel 122 secured to the clutch plate 70 and rotatably over the shaft 52. Thus, rotation of the switch control cam 96 will cause movement of the switch 110 according to the control cam surface 112, and rotation of the shaft actuating cam 94 will cause pivotal movement of the shaft actuating arm 114 according to the actuating cam surface 116 with this pivotal movement of the shaft actuating arm 114 through the shaft actuating pawl 120 and actuating wheel 122 causing stepped movement of the clutch plate 70, reverse movement thereof being prevented by the dogging arm 124 secured to the chassis 36 and engaged with the actuating wheel 122.

The record member positioning means generally indicated at 22 overlies the major portion of the time interval measuring means generally indicated at 20 and just described. The record member positioning means 22 is for the purpose of positioning one of the record members, generally indicated at 30, during the indication on these record members of the elapsed time intervals and expense charges with the use of the device of the present invention, all of which will be more fully discussed during the discussion of the operation hereinafter. For present purposes, it is sufficient to point out the record members 30 are sheetlike, preferably rectangular in configuration and formed of a relatively heavy paper.

Referring particularly to FIGS. 2, 5, 6 and 7, the record member positioning means 22 includes a base plate 126 having a forward downwardly curved end 128, the side flanges 130, the rearward end upstanding flange 132 and the rearward end central notch 134. This base plate 126 is received downwardly between the side plates 60 and 62 with the base plate side flanges 130 removably engaging these side plates and with the base plate overlying and engaging the crossbars 136 between the side plates. The base plate 126 thereby forms a plane surface overlying the major portion of the time interval measuring means 20 but, more important, the rearward end central notch 134 receives the stop switch 138 therein which is mounted extending upwardly from the chassis 36 and the rearward end upstanding flange 132 is positioned rearward of the effective portion of this switch. Also, the forward curved end 128 of base plate 126 is positioned just rearwardly of the friction roller 68 forming a part of the time interval measuring means 20.

A cover plate 140 having the side flanges 142 and the rearward end central notch 144 is positioned over and spaced above the base plate 126 with the side flanges 142 removably engaged outward of the side plates 60 and 62 and with the rearward end central notch 144 aligned with the base plate central notch 134 and also receiving the stop switch 138. In this manner, the base plate 126 and cover plate 140 form an elongated record member chamber 146 therebetween for retaining and positioning one of the record members 30, as will be hereinafter discussed. Also, these plates 126 and 140 perform this record member retention and positioning in cooperation with a cross roller 148 which overlies and resiliently frictionally engages the friction surface on the friction roller 68 of the time interval measuring means 20, as best seen in FIG. 6, and for a purpose likewise to be hereinafter described.

The indicator means generally indicated at 24 and also best seen in FIGS. 2, 5, 6 and 7 is formed by an indicator plate 150 having the side flanges 152 received outwardly over the side plates 60 and 62, so as to position this indicator plate overlying and spaced above both the friction roller 68 of the time interval measuring means 20 and the base plate 126 of the record member positioning means 22. Thus, when one of the record members 30 is positioned in the record member chamber 146 between the base and cover plates 126 and 140 with the forward end of this record member underlying the cross roller 148 and against the friction roller 68, the indicator plate 150 will overlie this record member. Also, the laterally spaced time interval opening 154 and expense charge opening 156 are formed through this indicator plate and are particularly positioned relative to the record member 30 and indications thereon, and the record member positioning means 22, as will be hereinafter discussed.

A marking opening 158 is also formed through the indicator plate 150 laterally aligned with the expense charge and marking openings 156 and 158, and this marking opening 158 is upwardly aligned overlying and for reception therethrough of the marking die 160 of a marking member 162 vertically, slidably mounted at the inner side of the side plate 60. Marking member 162 is normally resiliently urged downwardly so that the marking die 160 is spaced below the indicator plate 150 and the marking opening 158 thereof by the spring 164 and is selectively urged upwardly for reception of the marking die through the indicator plate marking opening by the forward end of a marking arm 166 pivotally mounted on the side plate 60. The rearward end of the marking arm 166 is selectively forced downwardly by the electric solenoid 168 and this arm's rearward end when in upward position is also engageable with a positioning collar 170 on the clutch actuating rod 84 when this rod is moved toward the side plate 62, thereby preventing the rod from moving back toward the side plate 60 until the marking arm 166 is moved downwardly by the electric solenoid 168. Still further, when the extreme rearward end of the marking arm 166 is in upward position, it engages a spring pressed stop pawl 172 and retains this pawl out of engagement with a toothed stop wheel 174 secured on the shaft 138, but when the arm rearward end is moved downwardly, it releases this pawl for engagement with the stop wheel and also engages a cycle terminating switch 176.

The timing means generally indicated at 26 is best seen in FIGS. 2, 8 and 9 and includes a synchronous speed, electric timing motor 180 having the drive shaft 182 mounting the drive gear 184 and pivotly mounting the angular gear arm 186, all of which are supported on the vertical plates 188 and 190, as shown. An idler gear 192 is mounted at the front portion of the gear arm 186 in engagement with the drive gear 184 and rotatable around this drive gear upon pivoting of the gear arm 186 to engage the drum gear 194 on the timing drum 196. The rearward end of this gear arm 186 is resiliently urged downwardly by the spring 198 and at the rearward extremity thereof is engaged with the plunger 200 of an electric solenoid 202, with this solenoid plunger 200 being vertically aligned for engagement by the previously described flange 92 on the blocking arm 90 mounted in association with the bell-crank arm 86 and with this plunger 200 being urged upwardly upon actuation of the solenoid 202.

Timing drum 196 is preferably hollow cylindrical and formed of a translucent material for the internal mounting of the light 204, with the 360° timing line 206 inscribed in the outer surface thereof. Axially adjacent the drum gear 194, this timing drum 196 is formed with a series of circumferential grooves 208 for receiving the ends of the time interval switch 210 and buzzer switch 212 slidable therein and aligned with the time interval notch 214 and buzzer notch 216 of the timing drum respectively and as particularly formed. A spring chamber 218 is formed within the timing drum 196 underlying the grooved portion thereof and this chamber encloses the one revolution coil spring 220 constructed specifically for resiliently resisting rotation of the drum over one complete revolution, but releasing at the end of this revolution for resiliently resisting the next revolution. At the same time, a flat spring 222 is mounted on the drum gear 194 aligned for engagement with the pin 224 on vertical plate 190, as best seen in FIG. 9, and this spring and pin are mounted in particular relationship with the one revolution coil spring 220 and drum timing line 206, with all cooperating to determine and fix single revolutions of the timing drum 196.

The gearing between the timing motor 180 and timing drum 196 is of appropriate sizes so that the timing motor will rotate the timing drum exactly one revolution per minute for this particular device and the progression of this minute is always visible on the timing drum through the timing line 206 so as to be visually determinable at any particular moment. Furthermore, the time interval notch 214 is positioned to close the time interval switch 210 for an instant at the termination of each minute and the beginning of the next, while the buzzer notch 216 is arranged for closing the buzzer switch 212 at a given time interval, say 15 seconds, prior to the termination of each one minute. The time interval switch 210 is operably, electrically connected to the previously described electric solenoid 108 which engages the pawl engagement arm 104, and the buzzer switch 212 is electrically connected to an electric buzzer 226, shown in FIG. 3, all for a purpose which will be clear from a description of the operation of the device.

The manual control means generally indicated at 28, and best seen in FIGS. 2, 3, 4 and 8, includes the insert-hold button 228 overlying an insert-hold button lamp 229 and start button 230, which buttons are mounted on the pivotal, generally L-shaped operating arms 232 and 234 respectively. The lower ends of these operating arms 232 and 234 are slidably engageable with a pivoted, upwardly spring urged control plate 236, which plate has the rearward, upwardly angled control flanges 238 and 240, control flange 240 extending upwardly at a greater angle than control flange 238. Thus, as seen in FIG. 4, when the insert-hold button 228 is pressed fully, the operating arm 232 will pass rearwardly beyond the control flange 238 of control plate 236 so that this control plate will pivot upwardly by its resilient urging and retain the insert-hold button in this down position, and the operating arm 232 in this rearwardly pivoted position. Thereafter, when the start button 230 is pressed downwardly and the operating arm 234 pivoted rearwardly, the lower end of this operating arm will merely engage the control flange 240, which will force the control plate 236 to pivot downwardly, releasing the operating arm 232, while at the same time not affecting the operating arm 234 as to pivotal movement.

The operating arm 232 is connected to a push rod 242, operating a switch 244 connected in the electrical circuit with switch 244 normally urging the push rod 242 forwardly and, therefore, normally urging the insert-hold button 228 upwardly. The operating arm 234 is connected to a push rod 246, with this push rod being engaged with the bell-crank arm 86 of the time interval measuring means 20 previously described. This push rod 246 is also spring urged toward its operating arm 234 by the spring 248 so as to normally urge the start button upwardly.

The record members generally indicated at 30, a typical example being shown in FIGS. 12 and 13, are for purposes of the present device formed rectangular of relatively heavy paper sheets 250, on which is imprinted a first column of time interval numbers 252 and a second aligned column of expense charge numbers 254 so that each of the consecutive expense charge numbers 254 are laterally aligned with corresponding consecutive time interval numbers 252. Since the device presently being described is for the purpose of indicating the elapsed time and expense charge of a telephone call, the time interval numbers 252 begin with zero and increase by increments of one, so as to denote complete one minute time intervals expired during the telephone call. The expense charge example shown is for a basic charge of $2.25 for the first three minutes, with an overtime per minute charge of $0.60 so that the expense charge numbers 254 are the same for the first three time intervals and then increase by $0.60 per time interval.

It will be noted that the indication of the number of complete time intervals expired will be zero for the first minute, one for the second minute, and so forth, that is, during any time interval, the indication is of the complete time intervals expired prior to the invasion of that time interval. For instance, between the second and third minute of a telephone call two complete minutes will have expired and the third minute will be in the process of being invaded so that between the second and third minutes the number 2 of the time interval numbers 252 will be indicated. As soon as the three minutes have expired and the fourth minute is being invaded, the number 3 of the time interval numbers 252 will be indicated denoting that three complete minutes have expired and the fourth minute is being invaded.

For this reason, the expense charges indicated by the expense charge numbers 254 are equal for the first three time interval numbers 252, that is, the numbers 0, 1 and 2. As soon as the time interval number 3 is indicated, this will indicate an invasion of the fourth minute, so that the overtime charge is added and the expense charge number 254 is indicated including the base rate plus the first one minute overtime charge. The most usual present day method of charging for telephone calls encountered is to charge a base rate for the first three minutes, or any portion thereof, and charge an additional one minute overtime charge for each minute or portion thereof over three minutes. Obviously, if this method of charging were changed, or the method of the particular locality is different, these figures could be changed accordingly.

Referring specifically to FIG. 1, the device as hereinbefore described is enclosed in a boxlike case, generally indicated at 256, and having the base portion 258 and cover portion 260. As shown, the cover portion 260 is formed with an appropriate opening for exposing the insert-hold button 228 and start button 230. Also, an appropriate record member insertion slot 262 is formed properly aligned and positioned with the forward end of the record member positioning means 22 (FIGS. 2 and 3) so that a record member 30 may be properly fed therein, and appropriate timing drum and time interval-expense charge viewing windows 264 and 266 are provided for properly viewing the timing line 206 on the timing drum 196 (FIG. 2) and the indicating openings formed by the time interval and expense charge openings 154 and 156 on the indicator plate 150 (FIG. 2).

As shown enlarged in FIG. 1, a phone attachment 268 is removably secured to a phone 270 by the rotatable securing plate 272 and includes a pivotal switch actuating arm 274 engageable by the receiver 276 of the phone and operating a switch 278 connected through the electrical line 280 into the electrical circuitry of the device. When the receiver 276 is resting on the phone 270, the switch actuating arm 274 is depressed moving the switch 278 to a nonrecording position, and when the receiver is removed from the phone, the switch actuating arm is released and releases the switch to a recording position.

In sequential operation of the device just described, assume that it is decided to place a phone call to a particular city, the first step is to choose the correct record member 30 having imprinted thereon the proper rate structure for the phone call to that particular city. Obviously, record members 30 may be preprinted for all of the major cities of the United States to which calls will be made. Once the proper record member 30 has been selected, and prior to the placing of the phone call, the insert-hold button 228 is pressed and the particular record member 30 fed into the record member insertion slot 262.

Pressing the insert-hold button 228 moves the push rod 242 rearwardly and changes the switch 244, which starts the drive motor 32 while this insert-hold button is locked in down position by the operating arm 232 engaging behind the control flange 238 of the control plate 236, as shown in FIG. 4. At this time, the time interval measuring means 20 is in the position shown in FIG. 3, since the start button 230 has not yet been pressed so that the cluch plate 64 is abutting the side of the friction roller 68. In view of this, the starting of the drive motor 32 through the various belts and pulleys begins rotation of the friction roller 68 in the clockwise direction as viewed in FIG. 6, and at the same time, lights the insert-hold lamp 229 beneath the insert-hold button 228, since this lamp is connected to the coil of the drive motor 32 and this coil acts as a transformer to power the insert-hold lamp 229.

As the friction roller 68 rotates and with the record member 30 being fed into the record member insertion slot 262, this record member is picked up by the friction roller and carried beneath the cross roller 148, beneath the indicator plate 150 and into the record member chamber 146 between the base plate 126 and cover plate 140 of the record member positioning means 22. Record member 30 continues this feeding action passing rearwardly through the record member chamber 146 until the end of the record member enters the base plate and cover plate central notches 134 and 144 engaging the stop switch 138, at which time, the drive motor 32 stops and the insert-hold lamp 229 goes out. This finally positions the record member 30 in the start position, with the zero time interval number 252 exactly aligned in the indicator plate time interval opening 154 and the $2.25 expense charge number 254 exactly aligned with the indicator plate expense charge opening 156.

In view of the fact that the drive motor 32 is stopped so that the friction roller 68 is stopped, the record member 30 is stationary continuing to bear against the stop switch 138 and retaining this switch in the drive motor off position. At the same time, the circuit of the device is arranged such that the receiver 276 of the phone 270 may be picked up, so as to release the switch actuating arm 274 and permit the phone switch 278 to move to recording position. The phone call may, therefore, now be initiated.

As soon as the station or party is reached, depending on the type of phone call involved, in this particular instance a station to station call, the start button 230 is immediately pressed downwardly to initiate the timing cycle and the timing of the phone call time period. The pressing of the start button 230 causes the operating arm 234 thereof to pivot and force the control plate 236 downwardly, thereby releasing the operating arm 232 of the insert-hold button 228 so as to return this button to its up position. Movement of the operating arm 232 of the insert-hold button 228 back to its original position, permits the connected push rod 242 to move forwardly as urged by the switch 244, thereby returning this switch 244 to its original position, and, for all intents and purposes, eliminating the effect of the switch 138, which was actuated by the record member 30 moving into the start position.

Additionally, the downward pressing of the start button 230 pivoting the operating arm 234 thereof rearwardly moves the connected push rod 246 rearwardly forcing the bell-crank arm 86 to pivot clockwise, as viewed in FIG. 3, which converts the control switch 88 and moves the clutch actuating rod 84 toward the side plate 62, pivoting the clutch actuating arm 82 to draw the clutch control rod 74 toward the side plate 60 against the pressure of the spring 80. This movement of the clutch control rod 74 through the clutch control arms 76 and 78 shifts the clutch plate 64 away from abutment with the friction roller 68 and the clutch plate 70 into abutment with this friction roller, so that any rotation of the friction roller 68 and therefore the movement of the record member 30 is controlled through and caused by the clutch plate 70.

As indicated by broken lines in FIG. 3 and shown in full lines in FIG. 8, prior to the movement of the bell-crank arm 86, that is, when this bell-crank arm is in the the at rest position, the flange 92 of the blocking arm 90 underlies the plunger 200 of the electric solenoid 202 so that this plunger is retained upwardly. When the bell-crank arm 86 pivots clockwise, as described, it moves the blocking arm 90 in this same clockwise pivotal motion so as to move the flange 92 from beneath the solenoid plunger 200 permitting this plunger to drop and engage behind the bell-crank arm 86. The downward movement of the solenoid plunger 200 also pivots the gear arm 186 and thereby moves the idler gear 192 into engagement with the drum gear 194 providing driving engagement between the timing motor 180 and the timing drum 196.

Locking of the bell-crank arm 86 in this pivoted position by the solenoid plunger 200, locks this bell-crank arm in engagement with the control switch 88, thereby retaining this control switch in the switched position. Also, the movement of the clutch actuating rod 84 toward the side plate 62 moves the positioning collar 170 toward this side plate and causes engagement between this positioning collar and the marking arm 166. This, therefore, provides a second lock for the bell-crank arm 86, as well as the connected clutch control rod 74 and clutch actuating arm 82.

Engagement of the control switch 88 by the bell-crank arm 86 again starts the drive motor 32, but since the switch 244 has been returned to its original position, the lamp 229 beneath the insert-hold button 228 will not be lit. Engagement of switch 88 also starts the timing motor 180 and, in view of the driving connection between this timing motor and the timing drum 196, rotation of the timing drum commences and the switch 244 also lights the light 204 within this drum. Starting of the drive motor 32 causes rotation of shafts 44 and 52, but rotation of the shaft actuating cam 94 and switch control cam 96 is prevented by the engagement of the pawl engagement arm 104, and the friction roller 68 is prevented from rotation by the engagement therewith of the clutch plate 70 and the retention of this clutch plate 70 by the dogging arm 124.

Thus, during the first one minute interval of the phone call, the record member 30 is retained stationary by the now stationary friction roller 68 so that the record member exposes zero completed time intervals through the indicator plate time interval opening 154 and exposes the $2.25 three minute basic charge through the indicator plate expense charge opening 156. Also, during this first one minute interval, the timing drum 196 continues to progressively rotate moving the timing line 206 across the timing drum viewing window 264 of the case 256, so that the approximate portion of the one minute interval used may be determined at any moment. At the predetermined moment during the latter portion of the one minute time interval, the buzzer switch 212 drops into the buzzer notch 216 of the timing drum 196 momentarily actuating the warning buzzer 226, and at the end of the one minute time interval, the time interval switch 210 drops into the time interval notch 214 of the timing drum closing this time interval switch.

Closing of this time interval switch 210 completes a circuit to the electric solenoid 108, causing momentary actuation of this solenoid through a capacitor in this circuit which has been charged during the early portion of the time interval. Actuation of solenoid 108 momentarily raises the pawl engagement arm 104 which had been retaining the shaft actuating and switch control cams 94 and 96 from rotation, thereby releasing engagement pawl 100 and causing this pawl to engage the cam driving wheel 98 so that cams 94 and 96 begin to rotate one complete revolution, which is stopped at the end of one revolution by the re-engagement of the pawl engagement arm 104 which has now returned to down position.

Rotation of the switch control cam 96 causes a changing of the switch 110, which has no effect in the cycle at this time as long as the time period continues as will be later explained, but rotation of the shaft actuating cam 94 causes pivotal movement of the shaft actuating arm 114 which causes the shaft actuating pawl 120 to move the actuating wheel 122 one predetermined increment, thereby moving the friction roller 68 this predetermined increment in the counterclockwise direction, as viewed in FIG. 6. This movement of the friction roller 68 moves the record member 30 a single increment in the forward direction, tending to withdraw this record member from the record member chamber 146 and the distance of this stepped movement during each single rotation of the shaft actuating cam 94 corresponds exactly with the spacing of the time interval numbers 252 and expense charge numbers 254 on the record member 30. Thus, at the end of this first predetermined stepped movement of the record member 30, the number 1 of the time interval numbers 252 is indicated so as to indicate the accumulated total of one complete time interval has expired, and the $2.25 aligned number of the expense charge numbers 254 is indicated, since only one minute of the three minute basic charge has expired and the accumulated total of the expense charges therefore remains the same. The release of the stop switch 138 by this movement of the record member 30 has no effect on the circuit in view of the changing of this circuit at the commencement of the time period by the pressing of the start button 230.

During the second one minute time interval, the timing drum 196 continues to rotate and in the second revolution eventually repeating the buzzer actuation and record member stepped movement at the expiration of this second one minute interval. In this manner, throughout the extent of the phone call, the accumulated total of the completed one minute time intervals are indicated by the time interval numbers 252 of the record member 30, denoting that this accumulated total number of one minute time intervals have expired and the next one minute time interval is at that moment being invaded. At the same time, the aligned expense charge number 254 being indicated, is the expense charge for that number of completed one minute time intervals plus the charge for the next one minute time interval, since that next one minute time interval is being invaded.

Assuming that the phone call in this particular instance lasts for over eleven minutes and less than twelve, the receiver 276 is replaced on the phone 270 between this eleventh and twelfth minute. Replacing the receiver 276 depresses the switch actuating arm 274 on the phone 270 changing the switch 278. This immediately actuates the electric solenoid 168, pivoting the marking arm 166 forcing the marking die 160 into the marking opening 158 of the indicator plate 150, and thereby forming a permanent indicating mark 282 on the record member 30 aligned with the number 11 of the time interval numbers 252 and the $7.65 number of the expense charge numbers 254 for providing a permanent record of the accumulated total number of complete one minute time intervals and the accumulated total charge for the phone call.

The purpose of the switch 110 controlled by the switch control cam 96 is to prevent this previously described marking from taking place during the stepped movement of the record member 30. In other words, if the phone call is terminated at the exact moment of the ending of one time interval and the beginning of the next, which would be at the moment of rotation of the shaft actuating cam 94 and the stepped movement of the record member 30, as caused by the friction roller 68, the switch 110 will prevent actuation of the solenoid 168 and therefore the movement of marking die 160 by the marking arm 166 until this stepped movement of the record member has been completed by the completion of the rotation of the shaft actuating cam 94. As soon as the single rotation of the shaft actuating cam 94, and therefore the switch control cam 96, has been completed, the switch 110 moving into the depression of the cam surface 112 on the switch control cam 96 permits the actuation of the solenoid 168 to take place in the normal manner described.

Actuation of the solenoid 168 and the consequent pivoting of the marking arm 166 moves the rear portion of this marking arm downwardly to engage and depress the cycle terminating switch 176. Depression of the cycle terminating switch 176 retains the solenoid 168 actuated, and lights the glow lamp 284 connected into the circuit in the usual manner. Also, for this moment, in view of the downward movement of the rearward portion of marking arm 166, the positioning collar 170 on clutch actuating rod 84 is no longer engaged, but this rod including its connected components cannot move in view of the continued blocking of the bell-crank arm 86 by the plunger 200 of the solenoid 202.

As soon as the glow lamp 284 has completed its momentary cycle, the solenoid 202 is actuated, moving the plunger 200 thereof upwardly so as to release the bell-crank arm 86, which, since the clutch actuating rod 84 is no longer blocked by the positioning collar 170, pivots counterclockwise, as viewed in FIG. 3. This counterclockwise pivoting of the bell-crank arm 86 shifts the clutch plate 70 away from the friction roller 68 and the clutch plate 64 into reengagement with this friction roller, while at the same time, releasing control switch 88. Also, the upward movement of the solenoid plunger 200 permits this plunger to be blocked in upward position by the flange 92 of the blocking arm 90, and pivots the gear arm 186 to disengage the idler gear 192 from the drum gear 194, thereby releasing the timing drum 196 and permitting the spring 220 thereof to return this timing drum to a starting position.

The release of the control switch 88 stops the drive motor 32, and in view of the pivoting of the marking arm 166 having released the stop pawl 172 to engage the toothed stop wheel 174 on the shaft 38, movement of the friction roller 68 through the reengagement thereof with the clutch plate 64 will be prevented by a possible overrun during the stopping of this drive motor 32, which could otherwise take place. The release of the switch 88 also stops the timing motor 180 and turns off the timing drum light 204, deactivates the marking arm solenoid 168 and deactivates the solenoid 202, so that the entire device is in the original position prior to the start of the cycle by pressing the insert-hold button 228 for the original insertion of a record member 30.

The permanently marked record member 30 may now be pulled from the record member chamber 146 and outwardly through the record member insertion slot 262 of the case 256 so as to be completely free of the device. Notations may then be placed thereon as to the particular date the phone call was made, the number called and any other data which would be useful in a permanent record for referral at a later time.

Figure 11:
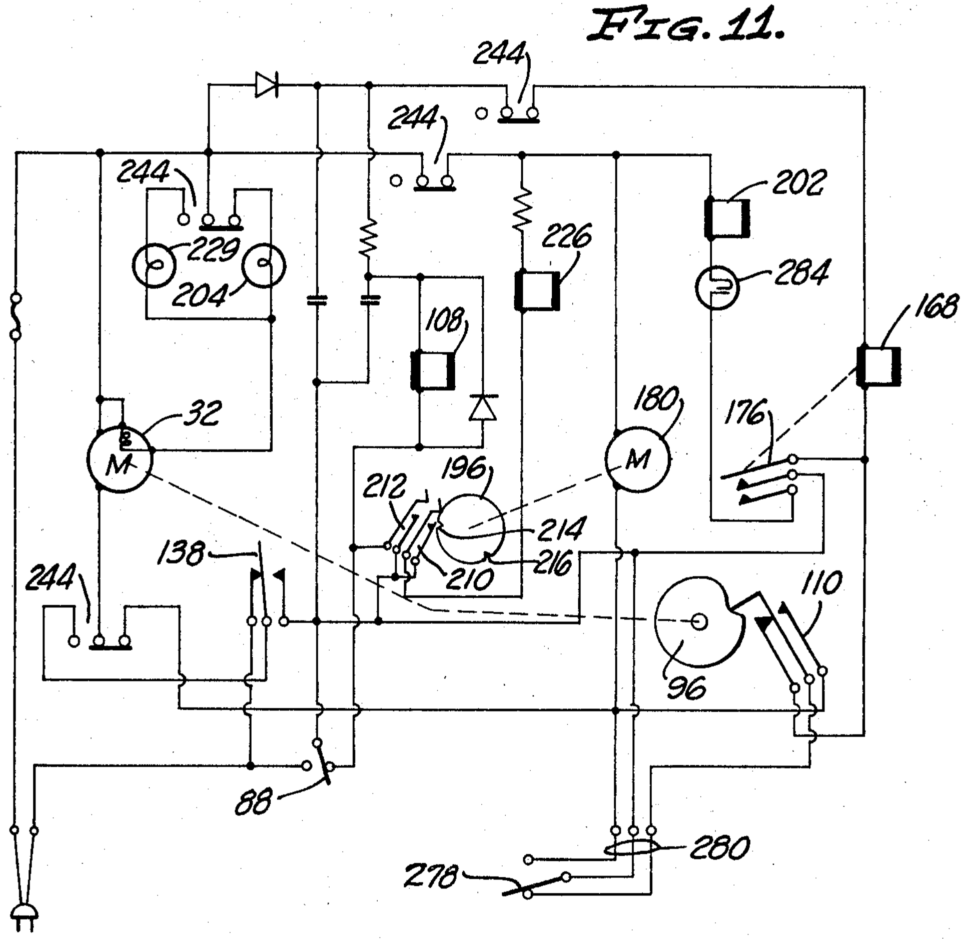
FIG. 11 is a representative wiring diagram of the time interval recording device of FIGS. 1 through 10.

A representative electrical circuit for the embodiment of the device of the present invention just described is shown in FIG. 11 with the various components being indicated by the same numbers as the indication thereof in the other views of the drawings. This circuit includes the other necessary electrical components, that is, the capacitors, rectifiers and resistors for the functioning of the device in the manner described.

As shown in FIG. 11, the circuit is in the position in which it would be during operation of the device after the first one minute time interval has expired and intermediate any time interval thereafter of the overall time period, with the switching of this circuit into the position during the original feeding of the record member 30 prior to the actual starting of the time period or the actuation of buzzer 226 and the stepped movement of the record member 30 at the end of each time interval being obvious from this circuit to one skilled in the art.

Thus, according to the principles of our present invention, a time interval recording device is provided in which the accumulated total complete time intervals expired are continuously indicated during the invasion of the next time interval and throughout the time period, with the accumulated total expense charge also being constantly indicated reflecting the total complete time intervals expired and the time interval presently being invaded. Furthermore, this is accomplished with a maximum of simplicity and without the complicated structure required in prior constructions by the incorporation of the device of the use of unique record members having the various data to be indicated imprinted thereon and the particular accumulated total expense charges precalculated properly related to the accumulated total complete time intervals expired at any particular instant during the time period. Also, a final permanent indication is automatically formed on the record member at the completion of the time period, and other permanent data may be written or otherwise placed on this record member, so as to provide a permanent record which can be referred to when necessary at a later time.

Where it is desired to use the time interval recording device of the present invention in conjunction with computerized record keeping and accounting systems, the record members 30 formed by the relatively heavy paper sheets 250, as hereinbefore described, may be replaced by standard size punched computer or business machine cards which have been imprinted with the time interval numbers 252 and expense charge numbers 254 in virtually the identical form and spacing as on the record members 30. In addition, these punched computer or business machine cards may have other data punched thereon, either before or after use with the time interval recording device of the present invention. Also, by slight alteration in the configuration of the marking die 160 and the indicator plate 150 to provide a permanent indicating mark 282 which is a standard rectangular punched-out opening as used with these computers and business machines, the permanent indicating mark providing the permanent record of the accumulated total number of complete time intervals and the accumulated total charge for the phone call may be read in the same manner as other business data by the computers or business machines.

The time interval recording device of the present invention may, therefore, be assimilated into a businessman's standard computer services merely by slight, obvious alterations in the record members 30 so as to adapt these record members into a form serving as standard computer or business machine punched cards. In this manner, these record members 30 may serve not only as permanent records of the particular phone call made, but may be used for and with other permanent accounting records, including additional data directly recorded thereon. Furthermore, these record member cards of this punched form may be used just as other similar computer and business machine cards for providing analysis and reconciliation figures, as well as other usual business data, in the businessman's accounting and record keeping systems.

We claim:

1. In a method of indicating elapsed time and a related expense corresponding to said elapsed time in varying time periods, each said time period formed by varying numbers and portions of the same equal time intervals, the steps of: starting a time period; continuously indicating by a single indication during and throughout the invasion of each time interval the accumulated total number of complete time intervals of said time period expired prior to said each time interval; changing said time interval indication at the expiration of each time interval to reflect in said accumulated total that time interval just expired; simultaneously, continuously indicating during and throughout said each time interval invasion by a single indication an accumulated total expense charge relating at a preplanned rate to the total number of said time intervals totally expired plus the charge for the entire of said each time interval invaded; changing said expense charge indication at the end of said each time interval to reflect, according to said preplanned rate, the time interval just expired plus the next time interval being invaded; and during said invasion of said each time interval, continuously progressively indicating the progressively increasing portion of invasion of said each time interval being invaded.

2. In a method of indicating elapsed time and a related expense corresponding to said elapsed time in varying time periods, each said time period formed by varying numbers and portions of the same equal time intervals, the steps of: forming a record member with a column of consecutive time interval numbers beginning with zero, each time interval number of said column relating to a different one of said time intervals and reflecting the total number of said time intervals expired prior to said one time interval; forming said record member with a column of expense charge numbers increasing along said column at a preplanned rate, said expense charge numbers relating to said time interval numbers and reflecting the accumulated total expense charge at said preplanned rate for the accumulated total complete time intervals expired as indicated by said time interval number plus the total expense charge for the entire of the next time interval being invaded;

starting a time period; continuously indicating on said record member during and throughout the invasion of each time interval the time interval number corresponding to the accumulated total number of complete time intervals of said time period expired prior to said each interval; changing said time interval number indication at the expiration of each time interval to the next higher time interval number to thereby reflect by said next higher time interval number, the accumulated total number of said complete time intervals expired; simultaneously, continuously indicating on said record member during and throughout said each time interval invasion by a single indication the expense charge number reflecting the accumulated total expense charge at said preplanned rate relating to the total number of said complete time intervals expired plus the total expense charge for the entire of said each time interval invaded; and changing said expense charge number indication at the end of said each time interval to the next expense charge number of said column to reflect according to said preplanned rate the accumulated total complete time intervals expired and the next time interval being invaded.

3. In a method of indicating elapsed time and a related expense corresponding to said elapsed time as defined in claim 2, the further steps of: ending said time period; and permanently indicating by a permanently visually discernible indication on said record member the final total number of complete time intervals expired, and the final total expense charge relating to the total complete time intervals expired plus the entire of the last time interval invaded.

4. In a method of indicating elapsed time and a related expense corresponding to said elapsed time as defined in claim 2 in which the time intervals are minutes; in which said accumulated total expense charges indicated are the same for the first three minutes of a time period and increase by a common increment for each minute of said time period after said first three minutes; in which said time interval number and expense charge number indications are visual indications; and in which said method includes the further steps of: during said invasion of said each minute time interval, continuously progressively visually indicating the progressively increasing portion of invasion of said each minute time interval being invaded; ending said time period; and permanently indicating by a permanently visually discernible indication on said record member the final total number of complete minutes expired in said time period, and the final total expense charge relating to the total complete minutes plus the entire of the last minute invaded.

5. In a method of indicating elapsed time and a related expense corresponding to said elapsed time in varying time periods, each said time period formed by varying numbers and portions of the same equal time intervals, the steps of: forming a series of sheet-like record members, each having a column of consecutive time interval numbers beginning with zero, and each time interval number of said column relating to a different one of said time intervals and reflecting the total number of said time intervals expired prior to said one time interval; forming each of said record members with a column of expense charge numbers increasing along said column at a preplanned rate, each of said expense charge numbers being aligned with a time interval number and relating to said time interval number to reflect the accumulated total expense charge at said preplanned rate for the accumulated total complete time intervals expired as indicated by said time interval number plus the total expense charge for the entire of the next time interval being invaded, said preplanned rate of increase for said expense charge numbers of certain of said record members being different from that of certain other of said record members reflecting different expense rates for time intervals of different time periods; selecting a particular record member having a particular time interval expense rate for a particular time period; starting a time period; continuously, visually indicating during and throughout the invasion of each time interval the time interval number on said selected record member corresponding to the accumulated total number of complete time intervals of said time period expired prior to said each time interval, said single continuous indication also simultaneously, continuously, visually indicating during and throughout said each time interval invasion the expense charge number aligned with said time interval number and reflecting the accumulated total expense charge at said preplanned rate relating to the total number of said time intervals totally expired plus the entire of said each time interval invaded; and changing said time interval number and said expense charge number visual indication at the expiration of each time interval to the next higher time interval number and next higher expense charge number, to thereby reflect by said next higher time interval number the accumulated total number of said complete time intervals expired, and reflect by the next expense charge number the accumulated total expense charge at said preplanned rate relating to the total number of said complete time intervals expired plus the entire of said each time interval invaded.

6. In a method of indicating elapsed time and a related expense corresponding to said elapsed time as defined in claim 5, the further steps of: during said invasion of said each time interval, continuously progressively indicating the progressively increasing portion of invasion of said each time interval being invaded; ending said time period; and permanently indicating by a single permanently visually discernible indication on said selected record member the final total number of complete time intervals expired, and the final total expense charge relating to said final total complete time intervals plus the entire of the last time interval invaded.

7. In a method of indicating elapsed time and a related expense corresponding to said elapsed time as defined in claim 5 in which said visual indicating of said time interval numbers and said expense charge numbers includes the forming of a visual indicator, positioning said selected record member adjacent said indicator, and intermittently moving one of said selected record member and said indicator; in which the time intervals are minutes; and in which said accumulated total expense charges indicated are the same for the first three minutes of a time period and increase by preplanned increments for the minutes of said time period after said first three minutes.

8. In an elapsed time recording device for indicating the number of equal time intervals expired in varying time periods and a related expense corresponding to said equal time intervals, the combination of: a timer; means for starting said timer to initiate a time period; time interval measuring means operably connected to the timer for intermittent movement at the expiration of each time interval; time interval indicating means operably connected to said time interval measuring means for movement by said time interval measuring means at the expiration of each time interval and continuously indicating by a single indication during and throughout the invasion of said each time interval the accumulated total number of complete time intervals of said time period expired prior to said each time interval; expense charge indicating means operably connected to said time interval measuring means for movement by said time interval measuring means at the expiration of each time interval and simultaneously with said time interval indicating means continuously indicating during and throughout said each time interval invasion by a single indication an accumulated total expense charge relating at a preplanned rate to the total number of said complete time intervals expired plus the expense charge for the entire of said each time interval invaded; and time interval invasion indicating means operably connected to said timer for constantly progresively visually indicating the progressively increasing portion of invasion of said each time interval being invaded.

9. An elapsed time recording device as defined in claim 11 in which there is means for stopping said timer to terminate a time period; and in which there is means operatively associated with said means for stopping said timer automatically actionable upon the stopping of said timer for simultaneously permanently indicating on a permanent record member the total complete time intervals of said time period expired and the total expense charge relating at said preplanned rate to said total number of said complete time intervals expired plus the expense charge for the entire of said time interval being invaded at the time of said stopping.

10. An elapsed time recording device as defined in claim 8 in which said equal time intervals of said time periods are minutes; in which said accumulated total expense charges indicated by said expense charge indicating means are equal for the first three time intervals of a time period and increase at preplanned overtime expense charges for the minutes after said first three minutes; and in which said means for stopping said timer is a switch on a telephone and actionable for stopping said timer by a telephone call being terminated.

11. In an elapsed time recording device for indicating the number of equal time intervals expired in varying time periods, the combination of: a timer; means for starting said timer to initiate a time period; time interval measuring means operably connected to the timer for intermittent movement at the expiration of each time interval; a sheet-like record member having a column of consecutive time interval numbers beginning with zero formed thereon, each time interval number of said column relating to a different one of said time intervals and reflecting the total number of said time intervals expired prior to said one time interval; record member positioning means operatively associated with said time interval measuring means for positioning said record member for intermittent movement by said time interval measuring means at the expiration of each time interval; indicating means positioned in a stationary position adjacent said record member column of numbers when said record member is positioned by said record member positioning means, said record member positioning means positioning said record member with said indicating means indicating said number zero of said record member column of numbers at the initiation of and during the invasion of the first of said time intervals, and said time interval measuring means moving said record member relative to said indicating means one number of said record member column of numbers at the expiration of said first and each subsequent time interval, whereby said indicated number of said record member column of numbers during the invasion of each time interval reflects the total number of time intervals expired prior to said each time interval; and time interval invasion indicating means operably connected to said timer for constantly progressively visually indicating independent of said record member the progressively increasing portion of invasion of said each time interval during the invasion of said each time interval.

12. An elapsed time recording device as defined in claim 11 in which there is means for stopping said timer to terminate a time period; in which there is total time interval marking means positioned adjacent said record member when said record member is positioned by said positioning means, said marking means being actionable for permanently marking said record member with a visually discernible permanent indication to indicate the number of said record member column of numbers being indicated by said indicating means at the termination of said time period; and in which there is means for operating said marking means at the termination of said time period.

13. An elapsed time recording device as defined in claim 11 in which there is means operatively associated with said record member positioning means actionable for automatically feeding said record member prior to said intiation of said time period into said position with said indicating means indicating said number zero of said record member column of numbers including switch actuating means contacted by said record member for automatically stopping said feeding upon said record member reaching said position.

14. In an elapsed time recording device for indicating the number of equal time intervals expired in varying time periods and a related expense corresponding to said equal time intervals, the combination of: a timer; means for starting said timer to initiate a time period; time interval measuring means operably connected to the timer for intermittent movement at the expiration of each time interval; a sheet-like record member having a column of consecutive time interval numbers beginning with zero formed thereon, each time interval number of said column relating to a different one of said time intervals and reflecting the total number of said time intervals expired prior to said one time interval, said record member having a column of expense charge numbers formed thereon increasing along said column at a preplanned rate, each of said expense charge numbers being aligned with a time interval number and relating to said time interval number to reflect the accumulated total expense charge at said preplanned rate for the accumulated total complete time intervals expired as indicated by said time interval number plus the expense charge for the entire of the next time interval being invaded; record number positioning means for positioning said record member; indicating means positioned adjacent said record member time interval and expense charge columns of numbers when said record member is positioned by said record member positioning means, said record member positioning means positioning said record member with said indicating means indicating said number zero of said time interval column of numbers and said aligned expense charge number of said expense charge column of numbers at the initiation of said time period; and means operably connecting one of said record member and said indicating means to said time interval measuring means for providing intermittent relative movement between said record member and said indicating means at the expiration of each time interval, said relative movement between said record member and said indicating means positioning said record member and said indicating means so that said indicating means indicates the next higher time interval number of said time interval column of numbers and said aligned expense charge number of said expense charge column of numbers at the end of each time interval and during the invasion of the next time interval, whereby said indicated time interval number during each time interval reflects the total complete number of time intervals expired prior to said each time interval and said indicated expense charge number reflects the accumulated total expense charge at said preplanned rate for said accumulated total complete time intervals expired as indicated by said time interval number plus the expense charge for the entire of said each time interval then being invaded.

15. An elapsed time recording device as defined in claim 14 in which there is means for stopping said timer to terminate a time period; in which there is total time interval and total expense charge marking means positioned in association with said indicating means actionable for permanently marking said record member with a visually discernible permanent indication to indicate said record member time interval and expense charge numbers being indicated by said indicating means at the termination of said time period; and in which there is means for operating said marking means at the termination of said time period.

16. An elapsed time recording device as defined in claim 14 in which said means providing relative motion between said record member and said indicating means includes a friction roller operably connected to said time interval measuring means during said time period for rotation of said roller in said intermittent movement; in which said record member positioning means positions said record member abutting said roller and permits slidable movement of said record member by said roller; in which said indicating means is stationary; and in which there is means operably associated with said record member positioning means and operably connected to said friction roller prior to said time period actionable for automatically feeding said record member prior to said initiation of said time period into said position with said indicating means indicating said number zero of said record member column of numbers.

17. An elapsed time recording device as defined in claim 14 in which said means providing relative motion between said record member and said indicating means is operably connected to said record member for slidably moving said record member by said time interval measuring means at the end of each time interval; in which said indicating means is stationary; and in which there is means operatively associated with said record member positioning means for automatically feeding said record member prior to the initiation of said time period into and automatically stopping said record member at a position in which said record member positioning means positions said record member with said indicating means indicating said number zero of said record member column of time interval numbers and said aligned expense charge number of said record member column of expense charge numbers.

18. An elapsed time recording device as defined in claim 14 in which time interval invasion indicating means is operably connected to said timer for constantly progressively visually indicating independent of said record member the progressvely increasing portion of invasion of said each time interval during said invasion of said each time interval.

19. An elapsed time recording device as defined in claim 14 in which said means providing relative motion between said record member and said indicating means includes a friction roller drive connected to said time interval measuring means during said time period for rotation of said roller in said intermittent movement; in which said record member positioning means positions said record member abutting said roller and permits slidable movement of said record member by said roller; in which said indicating means is stationary; in which there is means operably associated with said record member positioning means and drive connected to said friction roller constantly rotating said friction roller prior to said time period actionable for automatically feeding said record member prior to said initiation of said time period into said position with said indicating means indicating said number zero of said record member column of numbers; and in which there is means for shifting said friction roller drive connection from said constant rotation drive connection to said intermittent rotation drive connection at said initiation of said time period.

20. In an elapsed time recording device for indicating the number of equal time intervals expired in varying time periods and a related expense corresponding to said equal time intervals, the combination of: a timer; means for starting said timer to initiate a time period; time interval measuring means operably connected to the timer for intermittent movement at the expiration of each time interval; a sheet-like record member having a column of consecutive time interval numbers beginning with zero formed thereon, each time interval number of said column relating to a different one of said time intervals and reflecting the total number of said time intervals expired prior to said one time interval, said record member having a column of expense charge numbers formed thereon increasing along said column at a preplanned rate, each of said expense charge numbers being aligned with a time interval number and relating to said time interval number to reflect the accumulated total expense charge at said preplanned rate for the accumulated total complete time intervals expired as indicated by said time interval number and the next time period being invaded; record member positioning means for positioning said record member; indicating means positioned adjacent said record member time interval and expense charge columns of numbers when said record member is positioned by said record member positioning means, said record member positioning means positioning said record member with said indicating means indicating said number zero of said time interval column of numbers and said aligned expense charge number of said expense charge column of numbers at the initiation of said time period; means operably connecting one of said record member and said indicating means to said time interval measuring means for providing intermittent relative movement between said record member and said indicating means at the expiration of each time interval, said relative movement between said record member and said indicating means positioning said record member and said indicating means so that said indicating means indicates the next higher time interval number of said time interval column of numbers and said aligned expense charge number of said expense charge column of numbers at the end of each time interval and during the invasion of the next time interval, whereby said indicated time interval number during each time interval reflects the total complete number of time intervals expired prior to said each time interval and said indicated expense charge number reflects the accumulated total expense charge at said preplanned rate for said accumulated total complete time interval number and said each time interval then being invaded; a rotatable timing drum operably connected to said timer for constant rotation by said timer during said time period; and visual indicating means formed on said timing drum for visually indicating the portion of a time interval expired during the invasion of each time interval.

21. In an elapsed time recording device for indicating the number of equal time intervals expired in varying time periods and a related expense corresponding to said equal time intervals, the combination of: a timer; means for starting said timer to initiate a time period; time interval measuring means operably connected to the timer for intermittent movement at the expiration of each time interval, said operable connection between said time interval measuring means and said timer including a timing drum operably connected to said timer for constant rotation by said timer during a time period and means operably connected between said timing drum and said time interval measuring means for moving said time interval measuring means in said intermittent movement at the expiration of each time interval; a sheet-like record member having a column of consecutive time interval numbers beginning with zero formed thereon, each time interval number of said column relating to a different one of said time intervals and reflecting the total number of said time intervals expired prior to said one time interval, said record member having a column of expense charge numbers formed thereon increasing along said column at a preplanned rate, each of said expense charge numbers being aligned with a time interval number and relating to said time interval number to reflect the accumulated total expense charge at said preplanned rate for the accumulated total complete time intervals expired as indicated by said time interval number and the next time interval being invaded; record member positioning means for positioning said record member; indicating means positioned adjacent said record member time interval and expense charge columns of numbers when said record member is positioned by said record member positioning means, said record member positioning means positioning said record member with said indicating means indicating said number zero of said time interval column of numbers and said aligned expense charge number of said expense charge column of numbers at the initiation of said time period; and means operably connecting one of said record member and said indicating means to said time interval measuring means for providing intermittent relative movement between said record member and said indicating means at the expiration of each time interval, said relative movement between said record member and said indicating means positioning said record member and said indicating means so that said indicating means indicates the next higher time interval number of said time interval column of numbers and said aligned expense charge number of said expense charge column of numbers at the end of each time interval and during the invasion of the next time interval, whereby said indicated time interval number during each time interval reflects the total complete number of time intervals expired prior to said each time interval and said indicated expense charge number reflects the accumulated total expense charge at said preplanned rate for said accumulated total complete time intervals expired as indicated by said time interval number and said each time interval then being invaded.

References Cited

UNITED STATES PATENTS

| | | | |
|---|---|---|---|
| 433,445 | 8/1890 | Clark | 179—7.1 |
| 966,553 | 8/1910 | Jackson | 346—80 X |
| 1,254,259 | 1/1918 | More | 346—146 X |
| 2,216,528 | 10/1940 | Willis | 179—7.1 |
| 2,817,573 | 12/1957 | Larsson | 346—17 |
| 2,911,144 | 11/1959 | Lee et al. | 58—145 |
| 3,075,698 | 1/1963 | Fletcher | 235—92 |
| 3,185,770 | 5/1965 | Lombard | 179—7.1 |

RICHARD B. WILKINSON, *Primary Examiner.*

J. W. HARTARY, *Assistant Examiner.*